United States Patent
Eiselt

(10) Patent No.: US 8,818,205 B2
(45) Date of Patent: Aug. 26, 2014

(54) DIGITAL MODULATION METHOD AND DEVICE, ESPECIALLY AN OPTICAL DIGITAL MODULATION METHOD AND DEVICE

(75) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 100 days.

(21) Appl. No.: 13/331,963

(22) Filed: Dec. 20, 2011

(65) Prior Publication Data
US 2012/0163831 A1    Jun. 28, 2012

(30) Foreign Application Priority Data
Dec. 22, 2010 (EP) .................................. 10401221

(51) Int. Cl.
H04B 10/04 (2006.01)
H04B 10/50 (2013.01)
H04B 10/516 (2013.01)

(52) U.S. Cl.
CPC .............. *H04B 10/516* (2013.01); *H04B 10/50* (2013.01); *H04B 10/5053* (2013.01)
USPC ........... 398/183; 398/188; 398/185; 398/186; 398/193; 398/194; 359/237; 359/245; 359/248

(58) Field of Classification Search
USPC ......... 398/183, 185, 188, 186, 192, 193, 194, 398/198, 201, 158, 159, 161; 359/237, 238, 359/245, 279, 239, 247, 248
See application file for complete search history.

(56) References Cited

U.S. PATENT DOCUMENTS 7,826,752 B1    11/2010 Zanoni et al.
8,204,387 B2 *    6/2012 Fukuchi ........................ 398/201
2002/0080454 A1    6/2002 Schemmann et al.
2007/0177882 A1    8/2007 Akiyama
2008/0297270 A1    12/2008 Takahara et al.
2009/0196602 A1 *    8/2009 Saunders et al. ................ 398/26
2010/0142964 A1    6/2010 Chang et al.
2010/0329696 A1 *    12/2010 Yu et al. ........................ 398/188
2011/0170877 A1 *    7/2011 Akiyama ....................... 398/185

FOREIGN PATENT DOCUMENTS

DE    20 2006 000 197 U1    4/2006
EP    2 148 457 A2    1/2010

OTHER PUBLICATIONS

EPO, Extended European Search Report issued Jun. 20, 2011 in corresponding European patent application No. 10401221.6 (6 pages).

* cited by examiner

*Primary Examiner* — Hanh Phan
(74) *Attorney, Agent, or Firm* — The Culbertson Group, P.C.

(57) ABSTRACT

A modulation method, especially an optical modulation method, using the principle of discrete IQ modulation. The modulation method includes generating a carrier signal ($S_c$) and splitting the carrier signal at a splitting position in an I branch signal and a Q branch signal; modulating the amplitude of the I branch signal according to a first modulation signal and modulating the amplitude of the Q branch signal according to a second modulation signal, each of the first and second modulation signals being arranged to adopt a given number of values according to a given number of constellation points of a given modulation scheme; phase shifting the signal in the Q branch versus the signal in the I branch; and combining the signals in the I branch and Q branch at a combining position. The combined modulated signal ($S_{tx,mod}$) is arranged to be transmitted over a transmission path.

13 Claims, 5 Drawing Sheets

DIGITAL MODULATION METHOD AND DEVICE, ESPECIALLY AN OPTICAL DIGITAL MODULATION METHOD AND DEVICE

TECHNICAL FIELD OF THE INVENTION

The invention relates to a digital modulation method, especially an optical digital modulation method, using the principle of digital IQ modulation. Moreover, the invention relates to a corresponding digital modulation device.

BACKGROUND OF THE INVENTION

Complex phase and amplitude modulation schemes have become more popular in optical communications. IQ modulation is a modulation format in which the modulation constellations comprising a given number of constellation points cover the complex IQ plane. For optimum signal-to-noise performance, distinct modulation constellations can be found. For a constellation with three constellation points, the optimum points are the corners of an equilateral triangle. For more points, the optimum constellations are derived from this "simplex" constellation.

An optical IQ modulator typically consists of two parallel Mach-Zehnder amplitude modulators, one each to modulate the I- and Q-value of a symbol. This setup is also referred to as a "nested" Mach-Zehnder modulator. For multi-level modulation formats (more than 4 levels), the drive signals or analogue modulation signals for controlling the modulators are generated by a digital-to-analog converter (DAC). It is desired to reduce the required resolution of these DACs without compromising the noise tolerance of the generated signal. The optical phase between I and Q branches of the nested Mach-Zehnder modulator is 90 degrees.

Such a known optical modulating device 1 is shown in FIG. 1. A digital signal processing device 3 comprising a digital signal processing unit 5, two digital-to-analog converters 7, 9 and two analog amplifiers 11, 13 receives at least one digital transmit signal to be transmitted over an optical path (not shown) connected to an output port 15 of the modulating device 1. The signal processing unit 5 generates two digital modulation signals $S_{mod1}$ and $S_{mod2}$ which represent the I-values and the Q-values of the constellation points of a given IQ modulation scheme. The information concerning the modulation scheme and the I- and Q-values of the constellation points, respectively, and the mapping instructions as to how the information included in the at least one digital signal $S_{tx}$ is translated in or mapped to the constellation points and thus translated into the modulated optical signal $S_{tx,mod}$ provided at the output port 15 are implemented via software or hardware in the digital signal processing unit 5 (for example, stored in a dedicated memory or memory area) or are provided to the digital signal processing unit 5 by means of a separate signal (not depicted in FIG. 1). These instructions may include a specific coding of the information to be translated into the digital modulation signals $S_{mod1}$ and $S_{mod2}$. These modulation signals are converted into electrical analog modulation signals that are amplified by a respective amplifier 11, 13. The amplifiers may be linear or non-linear amplifiers, wherein a predetermined non-linearity may be used to optimize the creation of exact I- or Q-values (or of I- or Q-values with a sufficient accuracy) in case the corresponding digital-to-analog converter 7, 9 is unable to output a corresponding exact or sufficiently accurate digital value due to a rather low resolution.

The amplified electrical analog modulation signals are fed to the modulation signal input of an optical Mach-Zehnder modulator 17, 19 provided in the I branch and Q branch of an optical IQ modulator 21. The optical IQ modulator 21 receives a coherent optical carrier signal $S_c$ provided by a coherent continuous wave light source 23, for example a laser source, at a splitting point 25 realized by, for example, an optical 1:2 splitter. Between this splitting point 25 and a combination point 27, the I branch and Q branch of the optical modulator extend, wherein in the I branch the first Mach-Zehnder modulator 17 and in the Q branch the second Mach-Zehnder modulator 19 and a phase shifting device 29 are provided. The phase shifting device 29 may be provided before or after the second Mach-Zehnder modulator 19 in the direction of the signal flow.

The splitted signal $S_c$ in the I branch is amplitude-modulated by the first Mach-Zehnder modulator 17 according to the amplified electrical analog modulation signals output by the amplifier 11 and fed to the electrical modulation input port of the modulator 17. Similarly, the splitted signal $S_c$ in the Q branch is phase-shifted by the phase shifting device 29 by a fixed predetermined value of 90 degrees and amplitude-modulated by the second Mach-Zehnder modulator 19 according to the amplified electrical analog modulation signals output by the amplifier 13 and fed to the electrical modulation input port of the modulator 19. The modulated I branch signal and phase-shifted and modulated Q branch signal are combined at the combination point 27, the combination being realized as an adding of the two signals. The combined modulated transmission signal $S_{tx,mod}$ is provided at the output port 15 of the modulating device 1.

The signal $S_{tx,mod}$ may then be transmitted over an optical transmission link and received at the remote end of this link. The received signal may be demodulated via an optical IQ demodulator.

As the optimum constellation points are not located on a rectangular grid, the required DAC resolution to achieve exact constellation points or to achieve constellation points with a sufficiently high accuracy is high. FIG. 2 shows, as an example, the optimum constellation scheme for 7 points based on the "simplex" scheme. For the I-branch, 5 discrete values are required (−1,0; −0,5; 0; 0,5; 1,0) whereas for the Q-branch 3 values (−0,866; 0; 0,866) are required. The minimum resolution is therefore 3 bits. In addition, the amplitudes for the two branches differ, which leads to specific implementation challenges.

In order to reduce the number of discrete values or states of the electrical analog modulation signals, DE 20 2006 000 197 U1 describes an optical IQ transmitting device using a phase modulator in series with the respective Mach-Zehnder modulator in the I and Q branch, the phase modulator receiving control signals in order to provide for a phase shift of 0 or 180 degrees, respectively. In this way, two constellation points axially symmetric to the I or Q axis can be realized (through generating a corresponding modulated signal to be transmitted) by using the same value for the respective modulation signal fed to the Mach-Zehnder modulator and determining the algebraic sign of the constellation point by controlling the additional phase shift generated by the additional phase modulators to be 0 degrees or 180 degrees, respectively.

However, the disadvantage of this optical IQ transmitting device is that the number of discrete values necessary to generate the modulation signals according to the given constellation points is reduced only if the modulation scheme consists of as many pairs of axial symmetric constellation points as possible. Moreover, this structure of an optical IQ modulator requires additional hardware for realizing controlling the status of the additional phase modulators. Finally, the required resolution of the DACs may still be high if the discrete values of the modulation signals to be generated do not match with the discrete values creatable with a DAC having a lower resolution.

SUMMARY OF THE INVENTION

It is thus an object of the invention to provide a simple-to-realize discrete modulation method, especially an optical discrete modulation method which, for a given IQ modulation scheme having a predetermined number of constellation points, allows for a reduction of the number of I- and Q-values and/or the use of digital-to-analog converters for creating discrete analog values for the modulation signals in the I and Q branches having a lower resolution. Moreover, the invention provides a corresponding modulation device.

The basic principle of the current invention is to modify the phase between the two Mach-Zehnder branches to values deviating from 90 degrees and therefore to modify the angle between the I- and Q-axis. In this way, the required DAC resolution and/or the number of discrete values for the modulation signals in the I and Q branches can be reduced.

The optimum value or an advantageous value for the phase shift (other than 90 degrees) is specifically determined for a given IQ modulation scheme consisting of a given number of constellation points. The phase shift may be realized by using a phase shifting device generating a constant and fixed phase shift. Of course, the device generating the phase shift may also be controllable so that the value of the phase shift produced may be adapted to a change in the modulation scheme without changing the hardware.

According to a preferred embodiment of the invention the value of the phase shift, in comparison with using the same modulation format and a phase shift of 90 degrees between the I branch and the Q branch, may be chosen such that one or a combination of the following conditions are met:
 The sum of the numbers of values of the first and second modulation signals is reduced or minimized;
 The number of values of the first modulation signal comes closer to or comes as close as possible to the number of values of the second modulation signal;
 The values of the first and second modulation signals are exactly or with an error value less than a predetermined error threshold value or with an error value as low as possible creatable using a binary system with a minimum number of bits.

The constellation points of the modulation format may be positioned within the IQ plane such that every triple of non-co-linear constellation points neighbored with a minimum Euclidean distance form an equilateral triangle and that the phase shift between the signals in the I branch and Q branch equals 60 degrees. In this way, the discrete I- and Q-values assume values of integer multiples of half the distance between two neighbored points. This leads to an even distribution of the discrete values on both axes so that the values may easily be generated by a respective DAC with low resolution.

The invention is especially useful for, but not restricted to, realizing an optical modulating device using the principle of IQ modulation using discrete values (i.e. constellation points). In this case, the carrier signal generating device is an optical carrier signal generating device generating a coherent optical carrier signal, the optical splitting device and the optical combining device are optical 1×2 splitters, preferably passive optical splitters, the phase shifting device is an optical phase shifting device and the modulators are optical modulators receiving the first and second electrical modulation signals.

In a preferred embodiment of the present invention, the optical modulators are optical Mach-Zehnder modulators which are easy to realize and state of the art.

Preferably, the digital signal processing device includes a first and second digital-to-analog converter for converting the digital values of a first and second digital modulating signal into corresponding analog values of a respective first and second analog electrical modulating signal.

The digital signal processing device may further include a first and second analog amplifier for amplifying the first and second analog electrical modulation signal, respectively, in order to adapt the voltage of the electrical modulation signals to the input port requirements of the respective modulator. The amplifiers may also be non-linear amplifiers in order to reduce deviations of the digital values of the digital modulation signals (or respective analog values of the electrical modulation signals) from the exact values according to the constellation points.

These and other advantages and features of the invention will be apparent from the following description of illustrative embodiments, considered along with the accompanying drawings.

BRIEF DESCRIPTION OF THE DRAWINGS

The invention will be described in more detail below on the basis of the embodiments shown in the figures of the drawing. In the drawing.

DESCRIPTION OF ILLUSTRATIVE EMBODIMENTS

Figure 1:
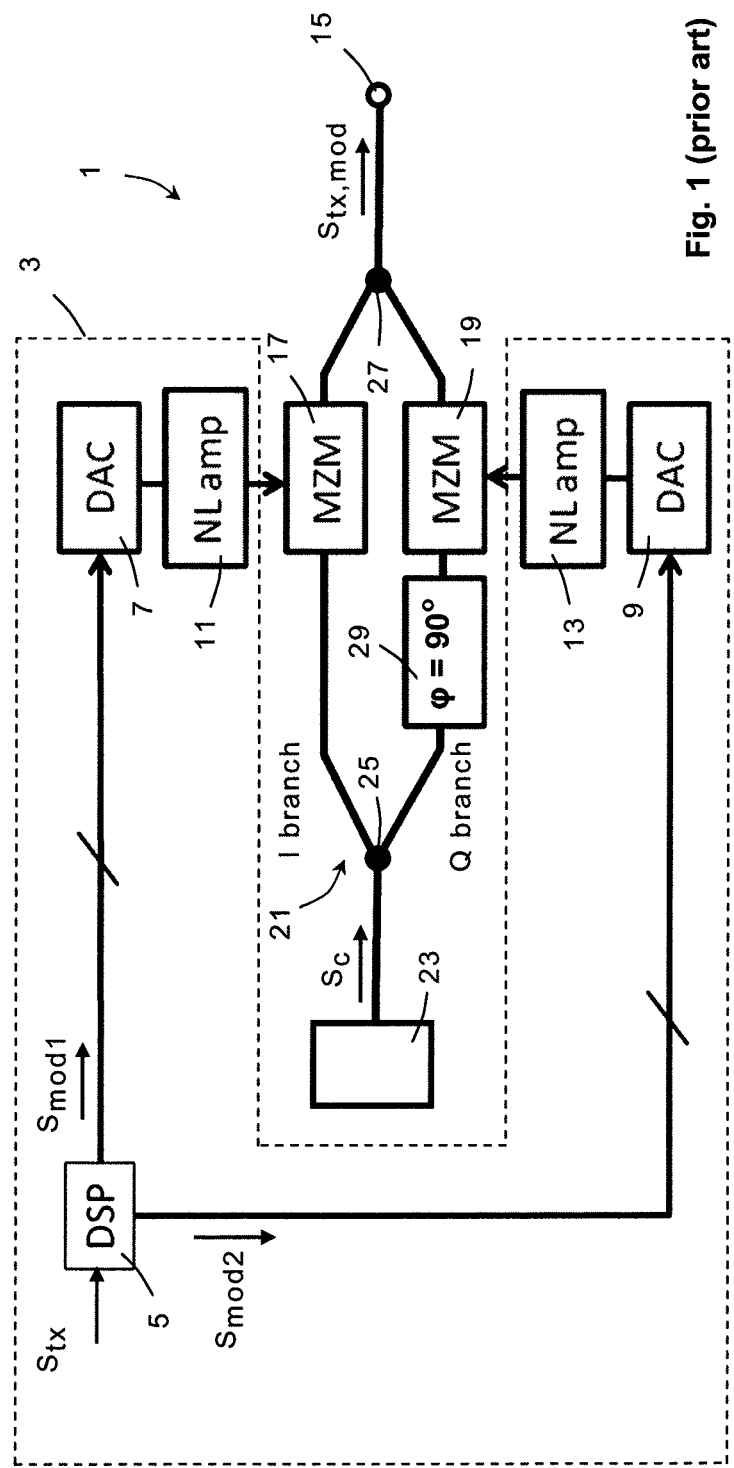
FIG. 1 shows a schematic block diagram of a known modulating device using discrete IQ modulation.
Figure 3:
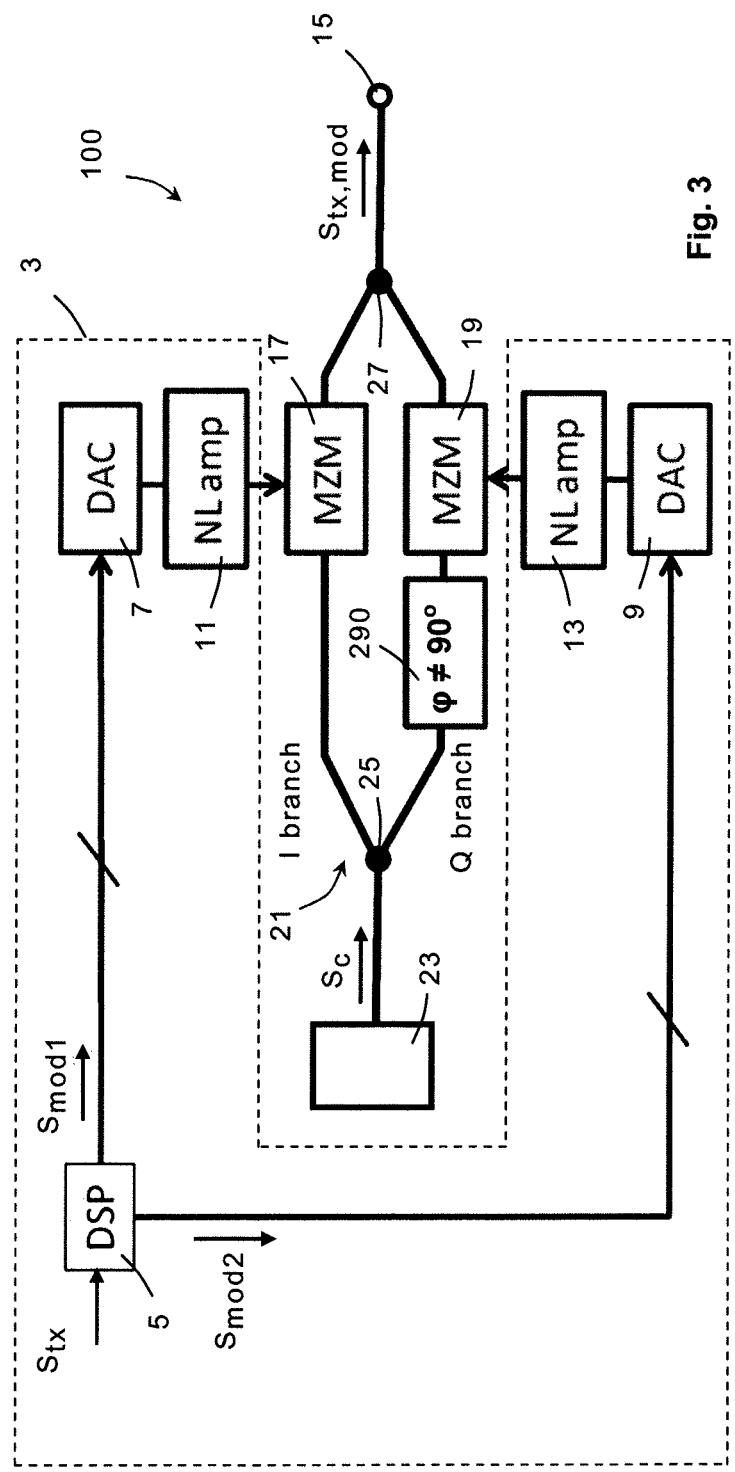
FIG. 3 shows a schematic block diagram of a modulating device according to the invention using discrete IQ modulation.

The modulating device 100 shown in FIG. 3 is, as far as hardware is concerned, practically identical to the device as shown in FIG. 1. Thus, reference is made to the above description of the known modulating device 1 with respect to the components of the modulating device 100 in so far as the principal functionality thereof is concerned. Such components are referred to with identical reference numbers.

The decisive difference between the known modulating device 1 according to FIG. 1 and the modulating device according to FIG. 3 is that instead of a 90° phase shifting device 29, a phase shifting device 290 is used which shifts the phase of the split optical carrier signal $S_c$ in the Q branch by an angle or value of φ≠90° versus the split optical carrier signal $S_c$ in the I branch. It is of course of no relevance whether the phase shifting device 290, which is in series with the Mach-Zehnder interferometer 19, is provided before or after the interferometer 19 in the direction of the signal flow.

Due to this phase shift φ≠90°, the I- and Q-axis do no longer form an orthogonal system. As a result, the discrete values for defining given constellation points of a given modulation scheme depend on the angle or phase shift φ. In other words, by choosing a suitable value for the phase shift φ, the values or the distribution of the I- and Q values of the given constellation points can be controlled such that a desired advantageous condition is fulfilled.

This enables, for example, to choose the angle φ such that the total number of discrete I- and Q values is reduced.

Figure 4:
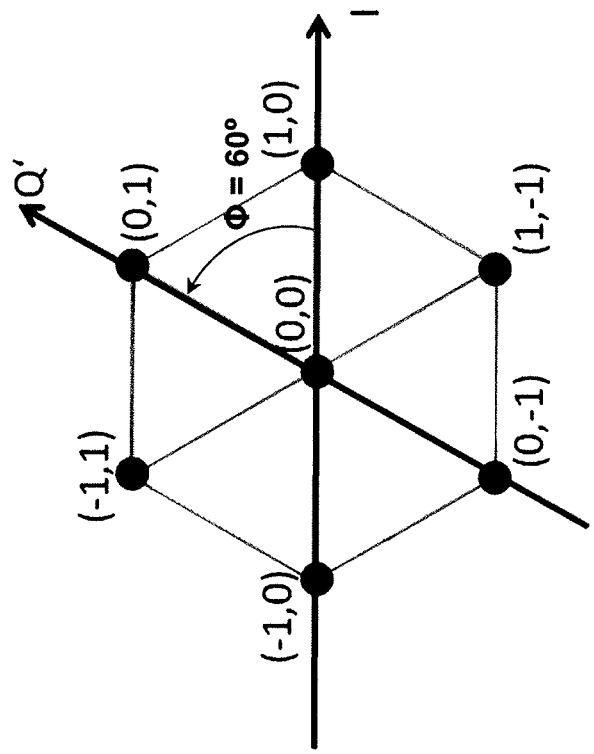
FIG. 4 shows a modulation scheme in the IQ plane for use with the modulating device in FIG. 3 comprising seven constellation points, the I- and Q axis forming an non-orthogonal system.
Figure 2:
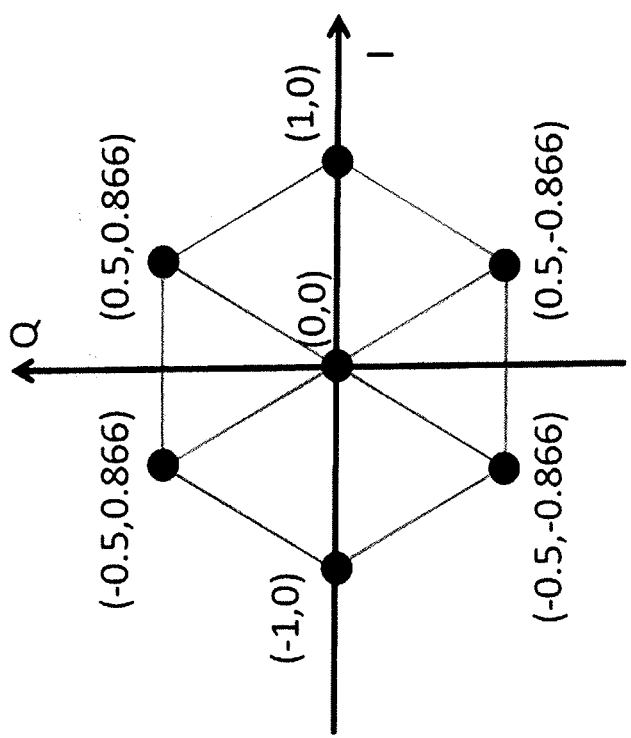
FIG. 2 shows a modulation scheme in the IQ plane according to the prior art comprising seven constellation points, the I- and Q axis forming an orthogonal system.

If, for example, the 7-constellation points scheme in FIG. 2 is used, this leads, in the orthogonal system in FIG. 2, to five values on the I axis and to three values on the Q axis, which amounts to a total of eight values. Using a phase shift of φ=60° as visualized in FIG. 4, the same seven constellation points can be defined by three distinct I-values (−1; 0; 1) and three distinct Q-values (−1; 0; 1). The total number of values is thus decreased from eight to six values. To generate these three I- and Q-values, respectively, two DAC's having a reduced resolution of 2 bits are sufficient whereas in case of the orthogonal system according to FIG. 2 a resolution of three bits for the DAC to generate the five distinct I-values is necessary.

Moreover, a more even distribution of the distinct values is obtained as, instead of five I-values and three Q-values in the orthogonal system, three I- and three Q-values suffice in the 60° slanted system. Additionally, in this example for a modulation scheme consisting of seven constellation points having a structure based on the "simplex" structure, the same values of −1, 0 and 1 on the I- and Q-axis are sufficient to define the constellation points. Thus, the analog amplifiers can be simple linear amplifiers. The required amplitudes from both branches are more symmetrical.

Figure 5:
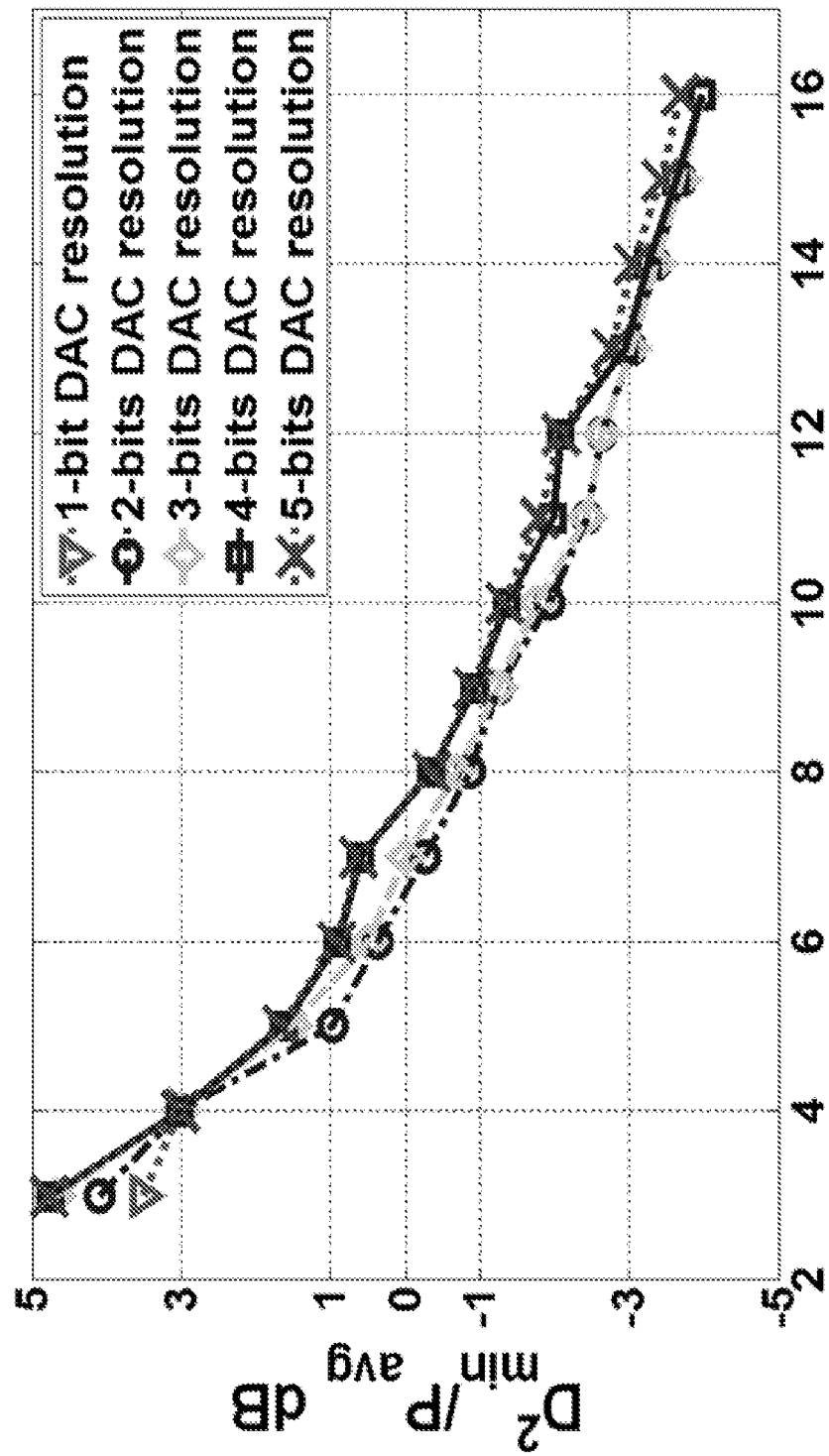
FIG. 5 shows a diagram visualizing the possible improvement of the noise tolerance for a 90° IQ modulation by increasing the DAC resolution, where $D_{min}/P_{avg}$ as a measure for the noise tolerance is displayed versus the number of constellation points.
Figure 6:
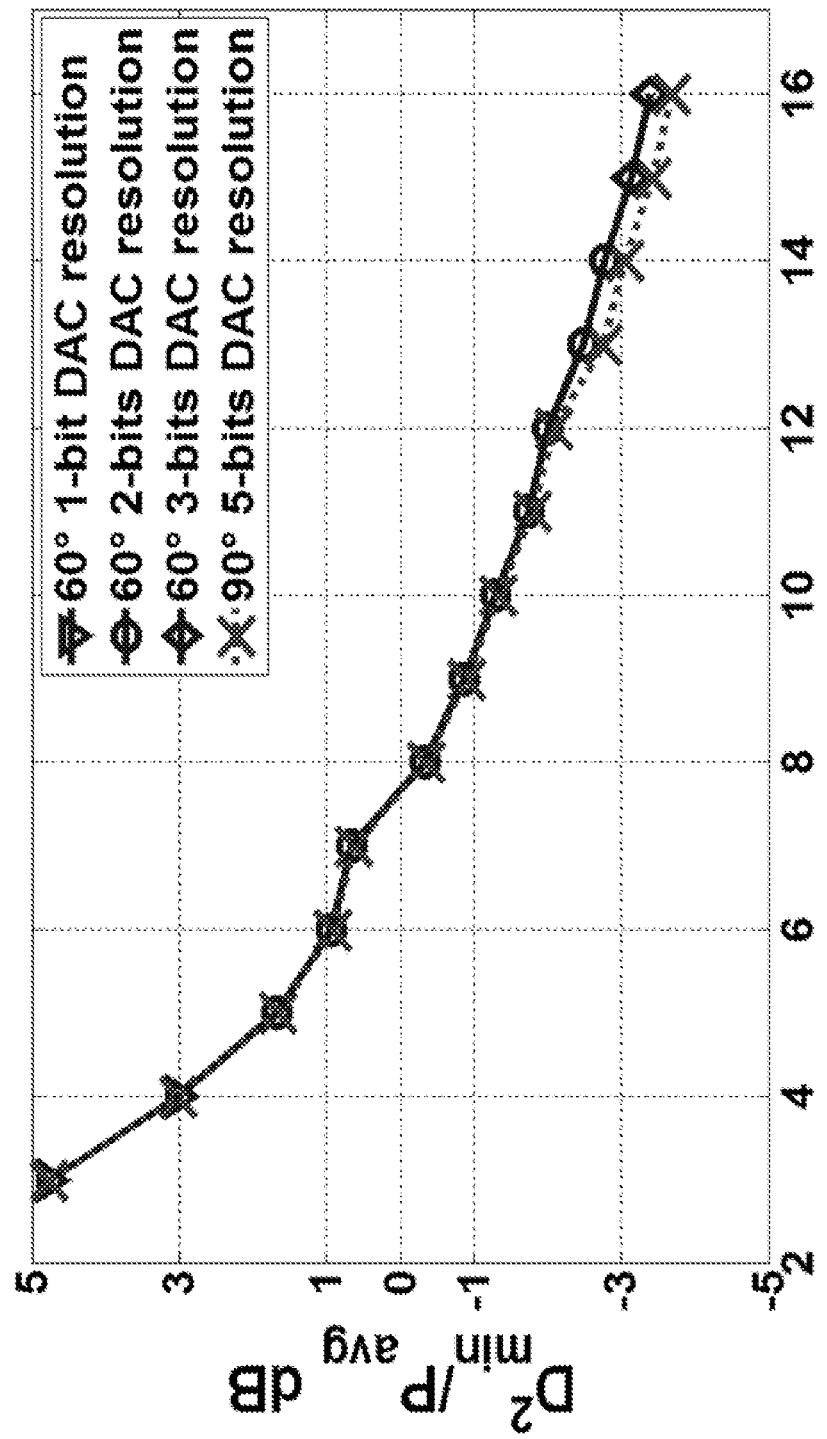
FIG. 6 shows a diagram similar to FIG. 4 comparing the 90° IQ modulation with a DAC resolution of 5 bit to a 60° IQ modulation with reduced DAC resolution.

FIG. 5 shows how increasing the DAC resolution for 90 degree I- and Q axes improves the noise tolerance of the achievable constellation, for which $D_{min}/P_{avg}$ is a measure, where $D_{min}$ is the minimum Euclidian distance between two neighbored constellation points and $P_{avg}$ is the average power of the modulated transmission signal $S_{tx,mod}$. FIG. 6 compares the 90° modulation with 5 bit resolution to 60° degree modulation with reduced DAC resolution. These diagrams were obtained by simulation under the assumption of Gaussian noise. It is apparent from FIG. 6 that for modulation schemes up to 16 constellation points, the noise tolerance of a 60° modulation using 1-bit DAC resolution (for the range up to 4 constellation points), 2-bit DAC resolution (for the range up to 14 constellation points) or 3-bit DAC resolution (for the range from 15 to 16 constellation points) is equal to or better than the noise tolerance of a 90° modulation using a 5-bit DAC resolution.

Altering the phase between the modulation axes can also be applied for 4-dimensional modulation, where I- and Q- components for each x- and y- polarization are modulated. However, for practical reasons (orthogonality of polarizations) the angle between Ix/Qx-and Iy/Qy-planes should be maintained at 90 degrees. The optimum angles between the I and Q axes in each polarization differ from 90 degrees and depend on the number of constellation points.

In a practical realization of such a 4-dimensional modulation device, the structure according to FIG. 3 may be extended by a second IQ modulator 21 receiving a second carrier signal having a 90 degrees rotated polarization plane as compared to the signal $S_c$. The digital signal processing device 3 may create two further digital modulating signals each of which is fed to a further respective DAC and amplifier. The so generated analog modulation signals control the Mach-Zehnder modulators of the further optical modulator. The further modulated signal may then be multiplexed with the modulated signal $S_{tx,mod}$ to form a combined signal to be transmitted.

Of course, the modulation signals may also be generated by a further digital signal processing device, receiving separate digital signals to be transmitted.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described illustrative embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A modulation method using the principle of discrete IQ modulation, the method comprising:
   (a) generating a carrier signal and splitting the carrier signal at a splitting position into an I branch signal travelling along an I branch and a Q branch signal travelling along a Q branch, the I branch and Q branch being provided between the splitting position and a combining position;
   (b) modulating the amplitude of the I branch signal according to a first modulation signal and modulating the amplitude of the Q branch signal according to a second modulation signal, each of the first and second modulation signals being arranged to adopt a respective given number of values according to a given number of constellation points of a given modulation scheme, wherein the values adopted by the first and second modulation signals are exactly, or with an error value less than a predetermined error threshold value or with an error value as low as possible, creatable using a binary system with a minimum number of bits;
   (c) phase shifting the Q branch signal versus the I branch signal by a predetermined value unequal to 90 degrees to produce a non-orthogonal phase shift; and
   (d) combining the I branch signal and the Q branch signal at the combining position to produce a combined modulated signal, the combined modulated signal being arranged to be transmitted over a transmission path.

2. The modulation method according to claim 1, wherein, in comparison with using the same modulation scheme and a phase shift of 90 degrees between the I branch signal and the Q branch signal, the value of the phase shift is chosen such that one or a combination of the following conditions are met:
   (a) the sum of the numbers of values of the first and second modulation signals is reduced or minimized; and
   (b) the quantity of the number of values adopted by the first modulation signal comes closer to or comes as close as possible to the quantity of the number of values adopted by the second modulation signal.

3. The modulation method according to one of claim 1 or 2, wherein the constellation points of the modulation scheme are positioned within the IQ plane such that every triple of non-co-linear constellation points neighbored with a minimum Euclidean distance form an equilateral triangle and that the phase shift between the I branch signal and the Q branch signal equals 60 degrees.

4. A modulating device using the principle of discrete IQ modulation, the modulating device comprising:
   (a) a carrier signal generating device for generating a high frequency carrier signal and a signal splitting device for splitting the carrier signal at a splitting position into an I branch signal travelling along an I branch and a Q branch signal travelling along a Q branch, the I branch and Q branch being provided between the splitting position and a combining position;
   (b) a first modulator provided in the I branch for modulating the amplitude of the I branch signal according to a first modulation signal and a second modulator provided in the Q branch for modulating the amplitude of the Q branch signal according to a second modulation signal, wherein the values adopted by the first and second modulation signals are exactly, or with an error value less than a predetermined error threshold value or with an error value as low as possible, creatable using a binary system with a minimum number of bits;
   (c) a phase shifting device for phase shifting the Q branch signal versus the I branch signal by a predetermined value unequal to 90 degrees to produce a non-orthogonal phase shift;
   (d) a signal combining device for combining the I branch signal and the Q branch signal at the combining position to produce a combined modulated signal, the combined modulated signal being arranged to be output at an output port of the modulating device; and
   (e) a digital signal processing device for receiving at least one digital transmit signal and for creating the first and second modulation signals thereby translating the information contained in the at least one digital transmit signal into the first and second modulation signals according to a given modulation scheme, each of the first and second modulation signals being arranged to adopt a respective given number of values according to a given number of constellation points of the modulation scheme.

5. The modulating device according to claim 4, wherein the carrier signal generating device is an optical carrier signal generating device creating a coherent optical carrier signal, and wherein the signal splitting device and the signal combining device each comprise a respective optical 1×2 splitter, and wherein the phase shifting device is an optical phase shifting device, and wherein the first modulator comprises a first optical modulator receiving the first modulation signal as a respective electrical signal and the second modulator comprises a second optical modulator receiving the second modulation signal as a respective electrical signal.

6. The modulating device according to claim 5, wherein the first and second optical modulators each comprise a respective optical Mach-Zehnder modulator.

7. The modulating device according to one of claims 5 to 6, wherein the digital signal processing device includes a first digital-to-analog converter for converting digital values of a first digital modulating signal into corresponding analog values for the first modulation signal, and a second digital-to-analog converter for converting digital values of a second digital modulating signal into corresponding analog values for the second modulation signal.

8. The modulating device according to claim 7 wherein the digital signal processing device includes a first analog amplifier for amplifying the first modulation signal and a second analog amplifier for amplifying the second modulation signal.

9. The modulating device according to claim 8, wherein at least one of the first and second analog amplifiers is a non-linear amplifier.

10. The modulating device according to any one of claims 4, 5, and 6 wherein, in comparison with using the same modulation scheme and a phase shift of 90 degrees between the I branch signal and the Q branch signal, the phase shifting device is designed such that it generates a phase shift so that one or a combination of the following conditions are met:
   (a) the sum of the numbers of values of the first and second modulation signals is reduced or minimized; and
   (b) the quantity of the number of values adopted by the first modulation signal comes closer to or comes as close as possible to the quantity of the number of values adopted by the second modulation signal.

11. The modulating device according to any one of claims 4, 5, and 6 wherein the digital signal processing device is designed so that constellation points of the modulation scheme are formed so that every triple of non-co-linear constellation points neighbored with a minimum Euclidean distance form an equilateral triangle and that the phase shift between the I branch signal and the Q branch signal equals 60 degrees.

12. A modulation method using the principle of discrete IQ modulation, the method comprising:
   (a) generating a carrier signal and splitting the carrier signal at a splitting position into an I branch signal travelling along an I branch and a Q branch signal travelling along a Q branch, the I branch and Q branch being provided between the splitting position and a combining position;
   (b) modulating the amplitude of the I branch signal according to a first modulation signal and modulating the amplitude of the Q branch signal according to a second modulation signal, each of the first and second modulation signals being arranged to adopt a respective given number of values according to a given number of constellation points of a given modulation scheme, wherein the constellation points of the modulation scheme are positioned within the IQ plane such that every triple of non-co-linear constellation points neighbored with a minimum Euclidean distance form an equilateral triangle and that the phase shift between the I branch signal and the Q branch signal equals 60 degrees;
   (c) phase shifting the Q branch signal versus the I branch signal by a predetermined value unequal to 90 degrees to produce a non-orthogonal phase shift; and
   (d) combining the I branch signal and the Q branch signal at the combining position to produce a combined modulated signal, the combined modulated signal being arranged to be transmitted over a transmission path.

13. A modulating device using the principle of discrete IQ modulation, the modulating device comprising:
   (a) a carrier signal generating device for generating a high frequency carrier signal and a signal splitting device for splitting the carrier signal at a splitting position into an I branch signal travelling along an I branch and a Q branch signal travelling along a Q branch, the I branch and Q branch being provided between the splitting position and a combining position;

(b) a first modulator provided in the I branch for modulating the amplitude of the I branch signal according to a first modulation signal and a second modulator provided in the Q branch for modulating the amplitude of the Q branch signal according to a second modulation signal;
(c) a phase shifting device for phase shifting the Q branch signal versus the I branch signal by a predetermined value unequal to 90 degrees to produce a non-orthogonal phase shift;
(d) a signal combining device for combining the I branch signal and the Q branch signal at the combining position to produce a combined modulated signal, the combined modulated signal being arranged to be output at an output port of the modulating device; and
(e) a digital signal processing device for receiving at least one digital transmit signal and for creating the first and second modulation signals thereby translating the information contained in the at least one digital transmit signal into the first and second modulation signals according to a given modulation scheme, each of the first and second modulation signals being arranged to adopt a respective given number of values according to a given number of constellation points of the modulation scheme, wherein the constellation points of the modulation scheme are positioned within the IQ plane such that every triple of non-co-linear constellation points neighbored with a minimum Euclidean distance form an equilateral triangle and that the phase shift between the I branch signal and the Q branch signal equals 60 degrees.

* * * * *